Patented Oct. 16, 1951

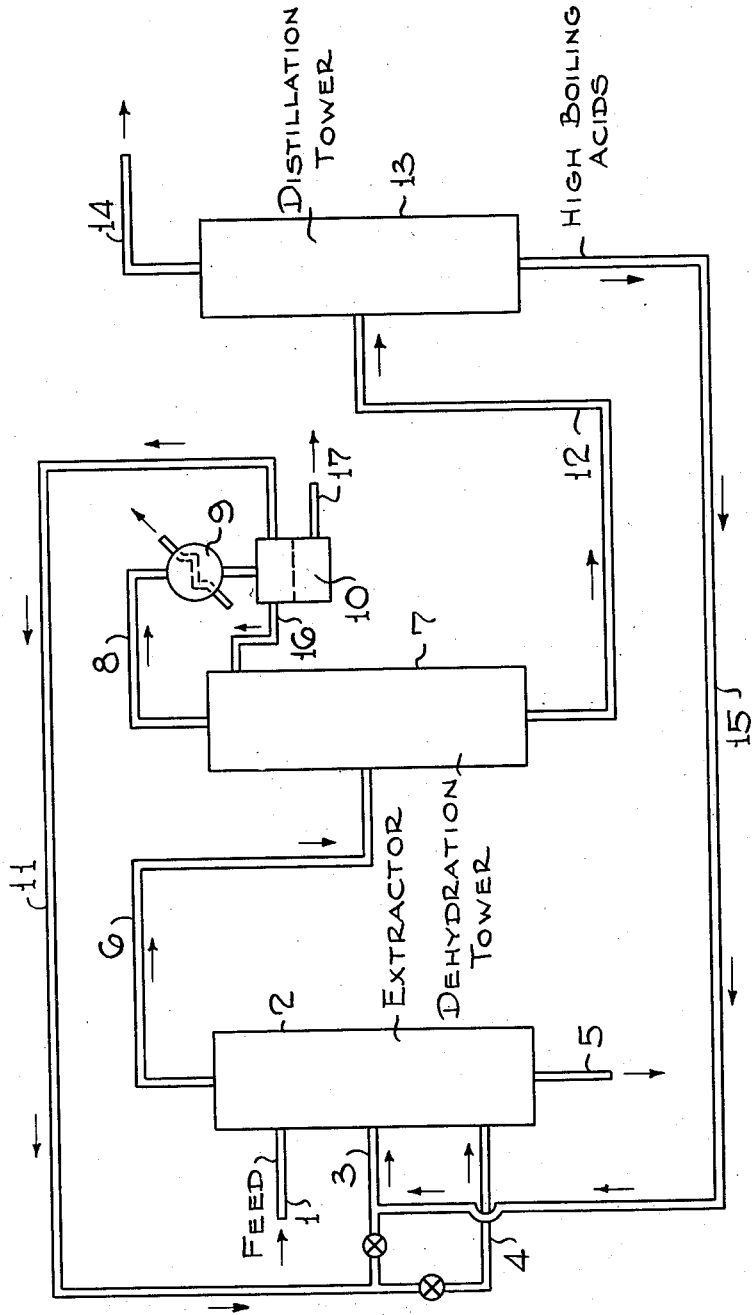

2,571,919

UNITED STATES PATENT OFFICE 2,571,919

PROCESS FOR CONCENTRATING AQUEOUS ACID SOLUTIONS UTILIZING COMBINATIONS OF LOW AND HIGH BOILING SOLVENTS

Charles E. Morrell, Westfield, N. J., assignor to Standard Oil Development Company, a corporation of Delaware Application December 2, 1948, Serial No. 63,027

6 Claims. (Cl. 260—419)

This invention relates to an improved process for extracting and dehydrating fatty acids when present in low concentrations in aqueous solutions. More particularly, it relates to an efficient, commercially feasible process for the extraction and purification of a mixture of fatty acids as found in low concentrations in the aqueous layer resulting from hydrocarbon synthesis reactions.

Hydrocarbon synthesis reactions are performed by contacing hydrogen and oxides of carbon with catalysts under various temperature and pressure conditions. The temperatures employed vary widely, as for example, in the range from about 200° C. to about 425° C. and are generally in the range from 260° C. to about 370° C. The particular temperature employed depends upon, among other factors, the type of non-gaseous hydrocarbon product desired, the character and the activity of the particular catalyst utilized, the throughput and composition of the synthesis gas feeds and upon the reaction pressure. The pressure, likewise, may vary considerably and is a function of other operative conditions such as catalyst employed, activity of the catalyst, character of the feed gases and the temperature utilized. Operations such as described are generally conducted under conditions to secure the maximum yield of hydrocarbon constituents containing 3 to 4 or more carbon atoms in the molecule. However, under the conditions of the operation, various side reactions occur which result in the production of valuable oxygenated compounds.

The proportions of the different types of products obtained also vary with the synthesis reaction conditions. In all cases, however, gaseous products removed as effluent from the reaction zone are condensed and segregated into a hydrocarbon oil phase and an aqueous phase.

The oxygenated compounds produced during hydrocarbon synthesis are distributed between the oil and water phases in a ratio which is a function of the relative volumes of product oil and water and the molecular weights and types of the oxygenated compounds produced. The molecular weight factor is especially important in the distribution of the oxygenated compounds of a given type between the two phases. In normal operations, the ratio of water produced to oil produced may vary over the range from about 0.8 to 3.0 volumes of water per volume of oil, depending upon the operating conditions and the catalyst employed during the synthesis. Accordingly, there is a wide variation in the proportion of the total oxygenated compounds existing in the water phase; and this extends over the approximate range from 10 to 40 weight percent.

The oxygenated compounds found in the water layer comprise the neutral compounds including alcohols, aldehydes, ketones, esters, and also fatty acids.

The neutral oxygenated compounds are recovered from the water layer by distillation carried on below about 100° C. The neutral compounds and their water azeotropes are thus stripped off first, leaving substantially only the fatty acids in the water. The stripped aqueous layer or acid water bottoms from most synthesis runs contains $C_2$–$C_{12}$ aliphatic acids (predominantly $C_2$–$C_6$) in a total concentration equivalent to about 2 to 5 weight percent calculated as acetic acid often nearer the lower figure. It is desirable to recover these acids in marketable purities and substantially quantitatively from the water, since their disposal as waste is not practical due to pollution problems and the expense of chemical disposal processes. In addition, these organic acids represent valuable chemical raw materials for a large variety of uses in industry.

Economic recovery of acids from water at such low concentration levels is quite difficult to achieve by conventional distillation methods because of the prohibitively large heat requirements and large equipment sizes necessary. This applies of course to any very dilute aqueous solution of lower fatty acids regardless of source as well as to the dilute solutions obtained from hydrocarbon synthesis reactions discussed.

Many solvents have been proposed for use in extraction processes but all present certain difficulties such as excessive costs of operation and failure of the processes to yield the acids in the desired anhydrous form and high degree of purity.

Low boiling organic solvents have been widely employed but suffer from the disadvantage that it is necessary to distill off the total amount of solvent used, a procedure which results in excessive heat requirements and costs. To get around this difficulty, various high boiling organic solvents have been utilized. Most of the high boiling solvents form azeotropes with the $C_4$ and higher acids present, however, and these azeotropes make difficult the recovery of both the acids and the solvent in pure form, and contributes to the losses of both of these items.

It has now been found that an extraction process, utilizing as an extracting medium, a low boiling organic solvent together with a carboxylic acid or a mixture of carboxylic acids, higher boiling than the fatty acid or acids it is desired to concentrate, is ideally adapted to overcome the before-mentioned difficulties.

It is to be understood that when the term "low boiling organic solvents" is used hereafter, it connotes normally liquid organic compounds having, at most, limited solubilities in water, good extractive capacities for acetic acid, propionic and higher fatty acids, and having boiling points below that of the acid being recovered, i. e. acetic acid, 118° C. Among the low boiling solvents which are known in the art and are suitable in the present invention are diethyl ether, diisopropyl ether, secondary butyl alcohol, n-butyl alcohol, methylethylketone, methylpropyl ketone, methylisopropyl ketone, ethyl acetate, n-propyl acetate, ethyl propionate, or appropriate mixtures of these. Low boiling hydrocarbons may also be used, although these have lower capacities than the solvents named above. These low boiling solvents form azeotropes with water and these azeotropes subsequent to distillation break up into water and organic phases making it easy to recover either phase. In general the maximum solubility of the low boiling solvents in water on a weight basis should be no more than about 25 percent and is preferably below this figure.

The carboxylic acids that may be employed in conjunction with the low boiling organic solvents in the extracting medium of this invention comprise $C_3$–$C_{12}$ acids. Whenever the term "higher boiling carboxylic acid" is used hereafter, it is to be understood that it connotes a carboxylic acid or mixture of acids which is higher boiling than the acid or acids that it is desired to concentrate.

The $C_2$–$C_4$ acids, or a mixture of these, may preferably be recovered by the process of this invention. These are connoted whenever the term "lower fatty acid" is used hereafter.

This invention will be better understood by reference to the following flow diagram.

In the system shown the aqueous acid feed containing acetic acid, the acid which it is desired to recover, is fed through line 1 to the upper part of extractor 2. The feed may contain a small amount of higher fatty acids. An extracting medium comprising a mixture of low boiling organic solvent and of a higher carboxylic acid, e. g. $C_3$ and/or higher acids are fed through line 3 to an intermediate portion of the extractor 2. The higher boiling carboxylic acids employed in the extracting medium may be fed through the same line as the low boiling solvent, or can be injected at various separate points in an intermediate portion of the extractor. Essentially pure low boiling solvent is fed to a lower point in the extractor 2 through line 4. A countercurrent extraction is thereby secured. In the upper part of the extractor 2 the combined extracting medium serves to extract the acetic acid from the aqueous feed. The fresh low boiling solvent which is fed to the lowest portion of the extractor serves to remove the higher boiling carboxylic acids from the descending aqueous solution and utilizes these acids in the combined extracting medium.

The aqueous raffinate or spent water layer leaves extractor 2 through line 5 and any remaining low boiling solvent and small amounts of higher boiling carboxylic acids dissolved therein may be recovered elsewhere or discarded. The extract phase leaving the extractor through line 6 contains an appreciable amount of water, acetic acid, low boiling solvent and $C_3$ and higher carboxylic acids. This mixture is fed into dehydration tower 7.

An azeotrope of low boiling solvent and water is taken overhead through line 8, from tower 7, cooled and condensed in condenser 9, and decanted in settler 10, where a two-phase separation takes place into an organic phase and an aqueous phase. Some of the low boiling solvent is recycled to extractor 2 through lines 11, and 4 and/or 3, and the remainder of the low boiling solvent is returned to dehydration tower 7 as reflux through line 16. It is, of course, possible and may even be desirable not to return any of the low boiling solvent through 3, rather sending all of it through 4. In general, it is desired to recycle one of the phases from settler 10 as reflux to tower 7. The actual one circulated will depend to some extent on the composition of the acid extract leaving the extractor. In case the water content of the acid extract is in excess of the amount necessary to form the aqueous azeotrope with the solvent, it will be desirable to reflux the organic solvent layer to the tower as shown. In case the solvent is the component in excess, then it may be desirable to reflux the aqueous layer. Where the aqueous layer is not refluxed, then it can be withdrawn through line 17 and discarded, recycled to the extractor or treated elsewhere to recover any dissolved solvents.

The residual liquid mixture of predominantly acetic acid and $C_3$ and higher carboxylic acids obtained as bottoms from tower 7 is sent through line 12 to distillation tower 13.

In distillation tower 13 substantially anhydrous acetic acid is taken off overhead through line 14 and residual higher boiling carboxylic acids are recycled through lines 15 and 3 to extractor 2.

The acid bottoms from distillation tower 13 comprises essentially propionic and higher acids, including the highest molecular weight components present in the aqueous acid feed, i. e., up to $C_{12}$ acids. The nature of the recycled acids or selected fractions thereof depends to some extent on the conditions in other parts of the system. If this recycled acid stream contains predominantly lower acids, e. g., propionic and butyric, such an acid mixture is a relatively better solvent for acetic acid than is an acid mixture of higher molecular weight. However, since the $C_3$ and $C_4$ acids are relatively more soluble in water than higher acids, in the former case more of these acids will be carried down as bottoms from extractor 2. This necessitates the use of more low boiling organic solvent in the lower portion of the extractor to obtain high acid recovery from the bottoms.

For the most part, it is desirable that the nature of the recycled acids or acid mixtures be chosen to minimize the overall steam requirements in the distillation towers, especially tower 7. Under certain circumstances, therefore, it may not be desirable to recycle the $C_3$ or other acids to the extractor, but rather to remove the propionic acid in a distillation subsequent to the distillation conducted in tower 13 and return to the extractor only the $C_4$ and higher acids. In the latter case, propionic acid is removed by distillation either as a purified product or as a crude product for purification elsewhere. Alternate procedures include the removal of butyric acid also and recycling of a portion of $C_5$ and higher acids. Other combinations are apparent to those skilled in the art. When the crude acidic water fed through line 1 to tower 2 contains acids which are also present in the higher acid mixture fed as solvent through 3, these acids tend to accumulate in the higher acid solvent. For this reason, it is in general necessary to remove a portion of the higher boiling acid stream from the cyclic system for either discard, purification or modification of composition by any other suitable means. This is especially true when as in dealing with hydrocarbon synthesis water layer, the recycled higher acid solvent stream tends to increase in amount with time of operation beyond the requirements of the extraction operation as outlined above. The portion of the higher acid stream withdrawn from the extraction system in this manner may be subjected to purification to produce pure higher boiling acids of commercial utility. The withdrawn portion may be separated by any desirable means and selected fractions thereof returned to the extraction system. In those cases where none of the withdrawn portion of the carboxylic acid solvent, or fractions thereof, is returned to the extraction system after a sufficient concentration has been built up in the system, then the composition of the higher boiling acid solvent in the extraction system is determined by the nature and relative amounts of the higher boiling acidic components present in the water fed to the extraction system. In certain cases it may be desirable to recycle to the extraction process acid fractions of the withdrawn portion which do not comprise adjacently boiling fractions; thus $C_5$ acids may be removed and $C_3$, $C_6$ and higher acids recycled. In general, however, this is not a desirable practice, since it results in distillation (and consequent excess steam consumption) of some of the acids which are to be recycled to the extractor.

The ratio of low boiling polar organic solvent to higher boiling acids used in the extraction medium may be varied over wide ranges and in certain instances where the higher boiling acids are of sufficiently high molecular weight, the amount of low boiling solvent present may be rather small, e. g., less than 10 percent. If higher acids are available it is desirable to use them along with the low boiling solvent when starting up a system of this type. However, if such is not the case, then start-up could be made with the low boiling solvent alone, using larger quantities than necessary in the final stabilized operation. Higher boiling acids would be accumulated and recycled with corresponding reduction in ratio of low solvent/high boiling acids required until the optimum ratio is attained. Thereafter the accumulated high boiling acids will be continuously removed to maintain the optimum ratio and handled as described above. In general, however, the nature of this mixture as regards solvent and higher carboxylic acid ratio will be controlled so that the mixture is not completely miscible with the water phase present. In other words, this composition is so controlled that upon injection into the tower the two-phase mixture results. The weight ratio of recycled higher boiling carboxylic acids to low boiling solvent varies from 1/20 up to 4/1, the preferred range being 1/10 to 2/1.

Make-up amounts of either of the materials used in the combined extracting medium may be added as needed.

One of the advantages of the process of this invention lies in the fact that it reduces the overall steam consumption and circulation rates of the low boiling solvent as compared to a process using the low boiling solvent only.

Another advantage resides in the fact that this process is free of undesirable azeotrope formation, because after removal of the low boiling organic solvent, only mixtures of acids are obtained, which are readily separable by conventional distillation operations.

As will be apparent from the foregoing the present invention may be practiced with modification other than those specifically described and under a variety of conditions of temperature, pressure and concentration of materials. Such modifications are part of this invention and are intended to be included therein.

What is claimed is:

1. A process for concentrating a lower fatty acid present in a dilute aqueous solution along with higher boiling carboxylic acids which comprises the steps of feeding the aqueous solution to an upper portion of an extraction zone; extracting the lower fatty acid in the extraction zone with an extracting medium comprising a low boiling organic solvent which enters the extraction zone at a lower and intermediate portion, and a higher boiling carboxylic acid which enters the extraction zone at the intermediate portion, at least a substantial part of the low-boiling organic solvent being introduced below the point of entry of the high-boiling carboxylic acid, the weight ratio of the high-boiling carboxylic acid to low-boiling solvent being in the range of 1/10 to 2/1; recovering a resulting extract phase containing low boiling solvent, lower fatty acid, water, and higher boiling carboxylic acids; distilling off the water and low boiling organic solvent from the extract phase in a first distillation step in a dehydration distillation zone; discharging the residual liquid bottoms predominantly lower fatty acid and higher boiling carboxylic acids mixture from the dehydration zone; distilling off the lower fatty acid in a second distillation step from the liquid bottoms mixture from the first distillation step; distilling a fraction of the higher boiling acids from the residual liquid from the second distillation step in a third distillation step and recycling the residual liquid acid bottoms from the third distillation step to the intermediate portion of the extraction zone.

2. A process as in claim 1, in which the lower fatty acid is acetic acid.

3. A process as in claim 2, in which the higher boiling acids distilled from the residual liquid from the second distillation step in the third distillation step is predominantly propionic acid.

4. A process for concentrating a lower fatty acid present in a dilute aqueous solution along with higher boiling carboxylic acids which comprises the steps of feeding the aqueous solution to an upper portion of an extraction zone; extracting the lower fatty acid in the extraction zone with an extracting medium comprising a low boiling organic solvent which enters the extraction zone at a lower and intermediate portion, and a higher boiling carboxylic acid which enters the extraction zone at the intermediate portion, at least a substantial part of the low-boiling organic solvent being introduced below the point of entry of the high-boiling carboxylic acid, the weight ratio of the high-boiling carboxylic acid to low-boiling solvent being in the range of 1/10 to 2/1; recovering a resulting extract phase containing low boiling solvent, lower fatty acid, water, and higher boiling carboxylic acid; distilling off the water and low boiling organic solvent from the extract phase in a first distillation step in a dehydration distillation zone; discharging the residual liquid bottoms predominantly lower fatty acid and higher boiling carboxylic acids mixture from the dehydration zone; distilling off the lower fatty acid in a second distillation step from the liquid bottoms mixture from the first distillation step, and recycling the residual liquid acid bottoms from the second distillation step to the intermediate portion of the extraction zone.

5. A process for concentrating a mixture of $C_2$–$C_4$ lower fatty acids present in a dilute aqueous solution along with higher boiling carboxylic acids which comprises the steps of feeding the aqueous solution to an upper portion of an extraction zone; extracting the lower fatty acids in the extraction zone with an extraction medium comprising a low boiling organic solvent which enters the extraction zone at a lower and at an intermediate portion and a higher boiling carboxylic acid which enters the extraction zone at the intermediate portion, at least a substantial part of the low-boiling organic solvent being introduced below the point of entry of the high-boiling carboxylic acid, the weight ratio of the high-boiling carboxylic acid to low-boiling solvent being in the range of 1/10 to 2/1; recovering a resulting extract phase containing low boiling solvent, $C_2$–$C_4$ fatty acids, water and higher boiling carboxylic acids; distilling off the water and low boiling organic solvent from the extract phase in a first distillation step in a dehydration distillation zone; discharging the residual liquid bottoms which is a substantially anhydrous mixture of predominantly $C_2$–$C_4$ fatty acids and higher boiling carboxylic acids mixture from the dehydration zone; distilling off the $C_2$–$C_4$ fatty acids in a second distillation step from the liquid bottoms mixture from the first distillation step and recycling the residual acid bottoms from the second distillation step to the intermediate portion of the extraction zone.

6. A process for concentrating a lower fatty acid present in a dilute aqueous solution which comprises countercurrently extracting said lower fatty acid in an extraction zone with a mixed extracting medium comprising an organic solvent and a carboxylic acid, said organic solvent being lower boiling than said fatty acid which is being extracted from the dilute aqueous solution and having only limited solubility in water, and said carboxylic acid having from 3 to 12 carbon atoms and being higher boiling than said fatty acid being extracted from said dilute aqueous solution, the point of entry in the extraction zone of said higher boiling carboxylic acid being intermediate to the point of entry of the dilute aqueous solution and to the point of entry of at least a substantial proportion of said lower boiling organic solvent, the weight ratio of the high-boiling carboxylic acid to low-boiling solvent being in the range of 1/10 to 2/1; withdrawing from said extraction zone an extract phase comprising said lower boiling organic solvent, water, higher boiling carboxylic acid, and extracted fatty acid, and dehydrating this extract phase by azeotropic distillation of the organic solvent and water to obtain a substantially anhydrous mixture of the lower fatty acid and the higher boiling carboxylic acid.

CHARLES E. MORRELL.

REFERENCES CITED

The following references are of record in the file of this patent:

UNITED STATES PATENTS

| Number | Name | Date |
|---|---|---|
| 1,696,432 | Dreyfus | Dec. 25, 1928 |
| 2,430,086 | Staff | Nov. 4, 1947 |